United States Patent
Yacoub

(10) Patent No.: US 9,228,464 B2
(45) Date of Patent: Jan. 5, 2016

(54) METHOD AND DEVICE FOR CONTROLLING AN INTERNAL COMBUSTION ENGINE

(75) Inventor: Yasser Mohamed sayed Yacoub, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 806 days.

(21) Appl. No.: 13/592,208

(22) Filed: Aug. 22, 2012

(65) Prior Publication Data
US 2013/0060454 A1 Mar. 7, 2013

(30) Foreign Application Priority Data
Sep. 6, 2011 (DE) .......................... 10 2011 082 189

(51) Int. Cl.
| | |
|---|---|
| F01N 3/20 | (2006.01) |
| F02D 41/02 | (2006.01) |
| F01N 11/00 | (2006.01) |
| F02D 41/06 | (2006.01) |
| F01P 7/14 | (2006.01) |
| F01P 7/16 | (2006.01) |

(52) U.S. Cl.
CPC .............. *F01N 3/2006* (2013.01); *F01N 3/202* (2013.01); *F01N 11/00* (2013.01); *F02D 41/0235* (2013.01); *F02D 41/068* (2013.01); *F01N 3/2013* (2013.01); *F01N 2430/00* (2013.01); *F01N 2550/02* (2013.01); *F01N 2900/0416* (2013.01); *F01N 2900/1621* (2013.01); *F01P 7/14* (2013.01); *F01P 7/164* (2013.01); *F01P 2037/02* (2013.01); *F02D 2200/021* (2013.01); *Y02T 10/26* (2013.01); *Y02T 10/47* (2013.01)

(58) Field of Classification Search
CPC ...... F01N 3/2006; F01N 3/2013; F01N 3/202
USPC ..................... 701/113; 60/284, 286, 300, 303
See application file for complete search history.

(56) References Cited

U.S. PATENT DOCUMENTS

| | | | | |
|---|---|---|---|---|
| 5,404,720 A | * | 4/1995 | Laing | F01N 3/2013 60/284 |
| 5,512,789 A | * | 4/1996 | Lyon | F01N 3/2013 219/205 |
| 8,783,012 B2 | * | 7/2014 | Ukropec | F01N 3/208 60/274 |
| 8,839,607 B2 | * | 9/2014 | Pursifull | F01N 3/10 60/274 |

FOREIGN PATENT DOCUMENTS

| | | |
|---|---|---|
| DE | 102005058202 A1 | 6/2006 |
| DE | 112005001064 T5 | 3/2007 |

* cited by examiner

*Primary Examiner* — Erick Solis
(74) *Attorney, Agent, or Firm* — Julia Voutyras; Alleman Hall McCoy Russell & Tuttle LLP

(57) ABSTRACT

Embodiments for heating a catalyst are provided. In one example, a method for controlling an internal combustion engine having an exhaust-gas aftertreatment device during a cold-start phase comprises adjusting a temperature of cooling water to a setpoint operating temperature as a function of a degree of aging of the exhaust-gas aftertreatment device of the internal combustion engine, wherein the temperature of the cooling water is increased more quickly as a present degree of aging of the exhaust-gas aftertreatment device increases.

20 Claims, 3 Drawing Sheets

METHOD AND DEVICE FOR CONTROLLING AN INTERNAL COMBUSTION ENGINE

RELATED APPLICATIONS

The present application claims priority to German Patent Application Number 102011082189.9 filed on Sep. 6, 2011, the entire contents of which are hereby incorporated by reference for all purposes.

FIELD

The disclosure relates to a method and a device for controlling an internal combustion engine having an exhaust-gas aftertreatment device during a cold-start phase.

BACKGROUND AND SUMMARY

For the oxidation of reductants in the exhaust gas from the internal or external combustion of fossil fuels, exhaust-gas catalytic converters are utilized, that is to say exhaust-gas aftertreatment devices with a catalytic noble metal coating.

An exhaust-gas catalytic converter, which is subjected to alternating high and low temperatures, of a motor vehicle is subjected to thermal aging, that is to say a degradation of the oxidation efficiency of the catalytic coating owing to noble metal sintering (shrinkage of the surface of the catalytic coating in contact with the exhaust gas owing to the clumping-together of the catalyst material).

The degree of degradation of the oxidation efficiency is dependent (with an Arrhenius or exponential relationship) on the temperature level and is substantially linearly dependent on the exhaust-gas mass flow speed.

The aging of the exhaust-gas aftertreatment device has the result that the light-off temperature of the exhaust-gas aftertreatment device in cold-start phases shifts toward higher temperatures over the course of time, which impairs the capability of the exhaust-gas catalytic converter to convert the reductants emitted by the internal combustion engine during cold-start phases.

In the current systems, it is attempted to increase the exhaust-gas temperature in order to accelerate the increase of the catalytic converter temperature beyond the light-off threshold. Said method leads to an increase in fuel consumption owing to the additional heat which is required from internal or external combustion devices.

The inventors herein have recognized the issues with the above approach and provide an approach to at least partly address them. In one embodiment, a method for controlling an internal combustion engine having an exhaust-gas aftertreatment device during a cold-start phase comprising adjusting a temperature of cooling water to a setpoint operating temperature as a function of a degree of aging of the exhaust-gas aftertreatment device of the internal combustion engine, wherein the temperature of the cooling water is increased more quickly as a present degree of aging of the exhaust-gas aftertreatment device increases.

In this way, a desired level of exhaust pipe cold-start emissions can be maintained with the least possible increase in fuel consumption. The proposed approach is based on limiting the emission of reductants in the engine exhaust gas as a countermeasure against the aging, and the associated rise in light-off temperatures, of exhaust-gas aftertreatment device. This is achieved in that the engine cooling water temperature is controlled as a function of the degree of aging of the exhaust-gas catalytic converter, specifically in such a way that the setpoint operating temperature of the cooling water is reached more quickly with progressive aging of the exhaust-gas catalytic converter.

This has the effect that the thermal losses from the combustion process are reduced, and the gas temperature in the cylinder thus increased, which leads to a reduction of the unburned fuel fraction, and therefore of the reductants, in the exhaust gas.

The advantage of said method is that the energy required to quickly heat the cooling water, which may have a total volume of 4 to 6 liters, to its setpoint operating temperature is significantly lower than the overall energy required to increase the temperature of the inlet gas flow (for example by bypassing the exhaust-gas recirculation cooler or by active heating in the inlet distributor) and/or the temperature of the exhaust-gas flow by use of a later combustion in the cylinder or an external combustion in the exhaust-gas flow.

Furthermore, passive mechanisms such as for example the control of the cooling water circulation in the cooling water tract make it possible to quickly increase the cooling water temperature in the cylinder head. Said cooling water temperature increases very quickly if the cooling water circulation is stopped, either by deactivating the cooling water pump or by control valves in the cooling water circuit.

To accelerate the heating of the cooling water in the case of high degrees of aging of the exhaust-gas catalytic converter, use may furthermore be made of active mechanisms such as for example an electric or microwave heater in the cooling water circuit. The associated effect of the faster heating of the engine oil owing to the coupling to the cooling water circuit through the oil heat exchanger has the secondary effect of reducing engine friction and thus lowering fuel consumption, which in the case of active heating, partially compensates the energy consumption thereof.

The above-described approach permits an optimum compromise between the demands of adhering to both emissions limits and also fuel consumption limits over the operating duration of the internal combustion engine or the service life of the exhaust-gas aftertreatment device.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
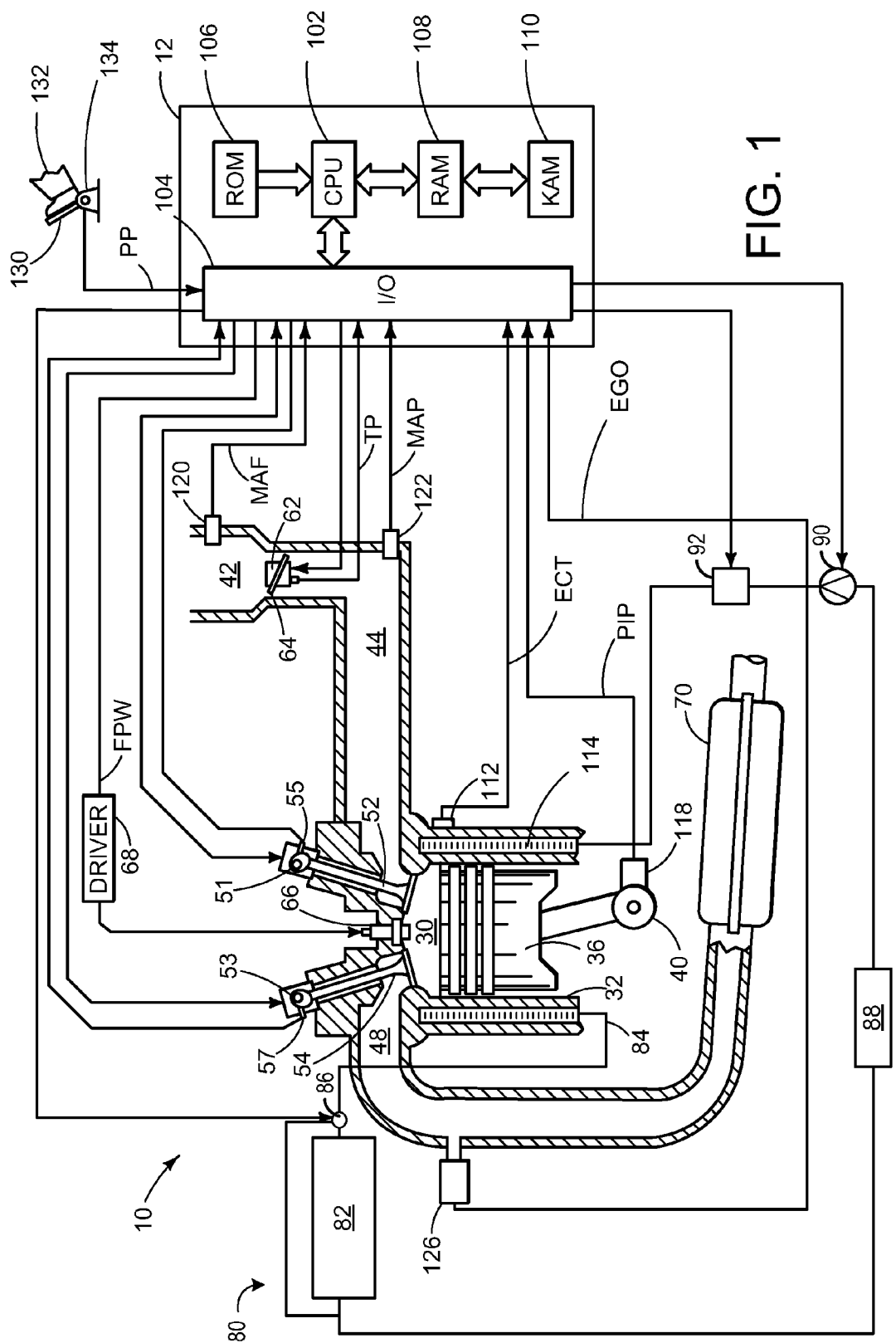
FIG. 1 is a schematic depiction of a single cylinder of a multi-cylinder engine.
Figure 2:
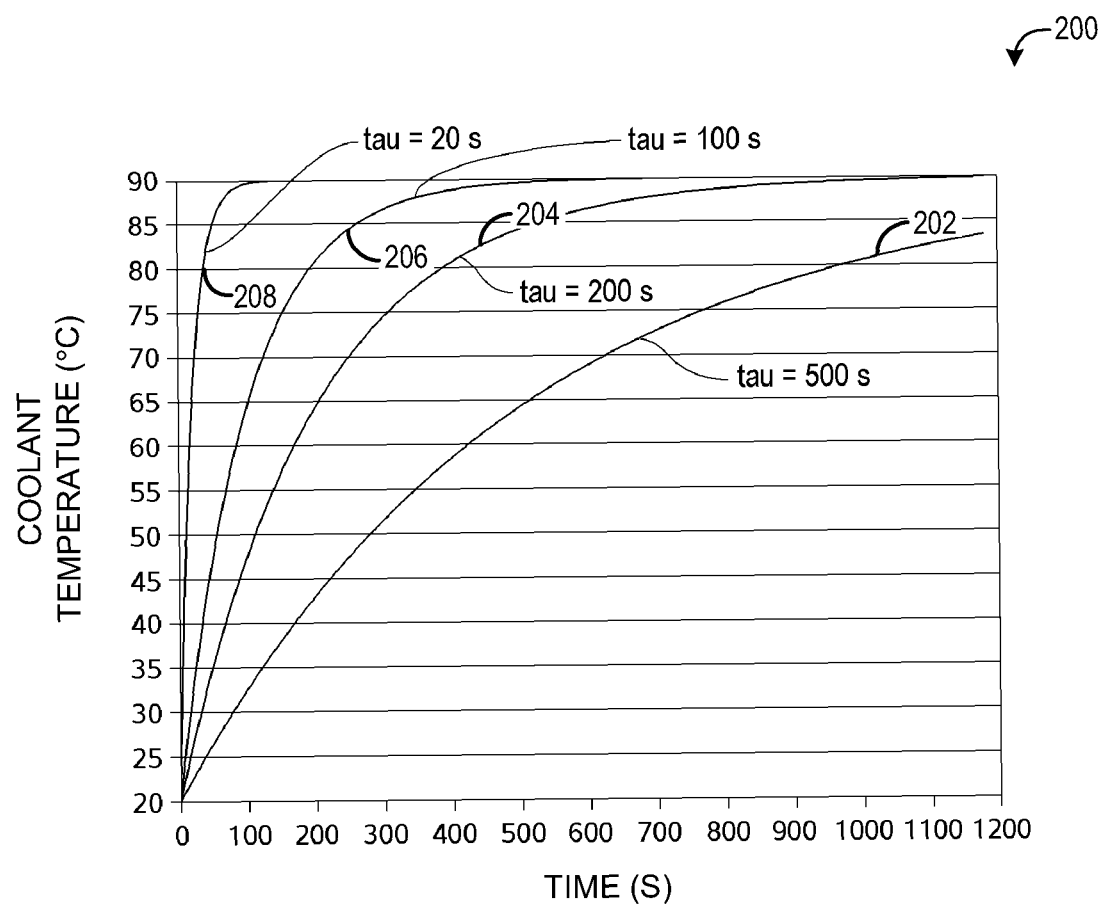
FIG. 2 is a graph illustrating example cooling temperature responses for a plurality of catalyst ages.

Exhaust catalysts convert emissions in the exhaust of an engine to non-toxic products which may be released to the atmosphere. Exhaust catalysts typically have a threshold temperature, referred to as the light-off temperature, below which the catalysts do not convert emissions at an efficient rate. Further, as catalysts age, the light-off temperature may increase. To rapidly heat the catalyst to the light-off temperature, even as the catalyst ages, the amount of time the engine cooling system takes to heat engine coolant to a predetermined setpoint temperature may be adjusted. For example, the cooling system may be configured to heat the coolant more quickly as the catalyst ages. FIG. 1 is an example engine including a cooling system and a controller for carrying out the method of FIG. 3. FIG. 2 depicts example cooling system responses for a plurality of catalyst ages.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 (also referred to as a catalyst or exhaust catalyst) is shown arranged along exhaust passage 48 downstream of exhaust gas sensor 126. Device 70 may be a three way catalyst (TWC), NOx trap, various other emission control devices, or combinations thereof In some embodiments, during operation of engine 10, emission control device 70 may be periodically reset by operating at least one cylinder of the engine within a particular air/fuel ratio.

Engine 10 may be cooled via engine cooling system 80. Engine cooling system 80 is configured to route coolant (such as water) through engine 10. For example, coolant that has circulated through engine 10 may exit the engine and be cooled via one or more radiators 82. The coolant may be routed from the engine, through the radiator 82, and back to the engine via passageway 84. Passageway 84 may include a valve or thermostat 86 configured to bypass coolant around radiator 82 when engine 10 is cold, for example. Various components may also be located along passageway 84, such as a coolant-to-oil cooler 88, which may cool the engine oil gallery (not shown). The cooled coolant may be pumped back to the engine via pump 90. In some embodiments, cooling system 80 may include a heater 92, such as an electric or microwave heater, to rapidly heat the coolant during a cold engine start.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

The engine cooling system described above may be regulated to maintain the coolant and hence the engine at a setpoint temperature. By doing so, emissions may be controlled while maintaining the engine at a safe operating temperature. However, the cooling water is also not always adjusted to the setpoint temperature as quickly as possible. Always increasing the cooling water temperature as quickly as possible would duly have a positive effect with regard to improved combustion of unburned fuel (HC, CO), but would have an adverse effect with regard to cold-start nitrogen oxide emissions, which would have to be compensated in a later phase in an operating cycle. Furthermore, a fast increase of the cooling water temperature is duly more energy-saving than an increase of the temperature of the inlet gas flow and/or of the exhaust-gas flow, but nevertheless comes at the cost of additional energy which is basically kept low owing to the correspondingly increased fuel consumption and/or carbon dioxide discharge. In the case of a new exhaust-gas catalytic converter, it is therefore better for the increase of the cooling water temperature not to be accelerated, or to be accelerated only slightly.

The present degree of aging of the exhaust-gas aftertreatment device may be determined on the basis of tables stored in a memory of an engine control unit (ECU) and/or on the basis of measurement variables, as is known per se.

In a preferred embodiment of the disclosure, during a cold start phase, the temperature of the cooling water is adjusted to the setpoint operating temperature as a function, which increases continuously with a continuously decreasing gradient, of the time, in particular as an exponential function of the (negative) time.

The disclosure is suitable in particular for internal combustion engines, in particular diesel engines, of motor vehicles.

FIG. 2 shows a graph 200 depicting examples of time profiles, controlled according to the disclosure, of the cooling water temperature, which corresponds approximately to the temperature of the engine oil, during a cold-start phase of an internal combustion engine in a motor vehicle.

In a motor vehicle having an internal combustion engine and an exhaust-gas catalytic converter, during a cold-start phase after the starting of the engine, the temperature of the cooling water rises from a relatively low temperature, normally the ambient temperature of for example around 20° C., to a setpoint operating temperature of for example around 90° C.

Without special measures, the cooling water temperature rises relatively slowly, for example in accordance with the curve 202 denoted by tau=500 s in the graph 200.

Owing to the aging of the exhaust-gas catalytic converter, the light-off temperature thereof in cold-start phases shifts toward higher temperatures over the course of time, which impairs the capability of the exhaust-gas catalytic converter to convert the reductants emitted by the internal combustion engine during cold-start phases.

To maintain a desired level of exhaust pipe cold-start emissions over the service life of the exhaust-gas catalytic converter, even for a relatively old exhaust-gas catalytic converter, with the least possible increase in fuel consumption, the cooling water temperature is allowed to rise, and tend toward the setpoint operating temperature, during a cold-start phase more quickly the more advanced the present degree of aging of the exhaust-gas catalytic converter is.

In particular, the cooling water temperature is preferably adjusted to the setpoint operating temperature in accordance with the following function:

$$T(t)=T_1-(T_1-T_0)\cdot e^{-t/\tau}$$

Where $T(t)$=cooling water temperature at time t after the starting of the engine, $T_0$=cooling water temperature upon starting of the engine (e.g. approximately 20° C.), $T_1$=setpoint operating temperature of the cooling water (e.g. approximately 90° C.), and $\tau$=constant.

The variable $\tau$ (tau) constitutes a constant only insofar as it is constant during one cold-start phase or during a few successive cold-start phases. Viewed over several cold starts, however, said variable becomes progressively smaller.

The variable $\tau$ is expediently set such that, for a new exhaust-gas catalytic converter, it is of the order of magnitude of a few hundred seconds, the characteristic warm-up time of the cooling water. In this way, the variable tau represents the time after which the cooling water temperature still differs from the setpoint operating temperature by the fraction 1/e of the temperature difference $(T_1-T_0)$.

The function specified above furthermore constitutes a solution to the differential equation:

$$dT(t)/dt=(T_1-T_0)/\tau,$$

specifically under the boundary conditions $T(0)=T_0$ and $T(\infty)=T_1$.

In the graph 200, the curve 202 denoted by $\tau$=500 s shows the rise of the cooling water temperature in the case of a fresh, that is to say new, exhaust-gas catalytic converter.

The curve 204 denoted by $\tau$=200 s shows the rise of the cooling water temperature in the case of an exhaust-gas catalytic converter with a certain first degree of aging. The curve 206 denoted by $\tau$=100 s shows the rise of the cooling water temperature in the case of an exhaust-gas catalytic converter with a second degree of aging greater than the first degree of aging. The curve 208 denoted by $\tau$=20 s shows the rise of the cooling water temperature in the case of a heavily aged exhaust-gas catalytic converter with a third degree of aging greater than the second degree of aging.

To implement the approach described herein, during a cold-start phase, the cooling water temperature is if required increased, such that the temperature profile satisfies the above function, by suitable control of passive mechanisms such as a cooling water circulating pump in the cooling water tract and/or valves in the cooling water circuit and/or by active mechanisms such as an electric or microwave heater in the cooling water circuit. Only in the case of a completely new exhaust-gas catalytic converter might it be the case that such mechanisms are not be activated, because the normal rise behavior of the cooling water temperature substantially corresponds to the desired profile of the temperature rise.

Figure 3:
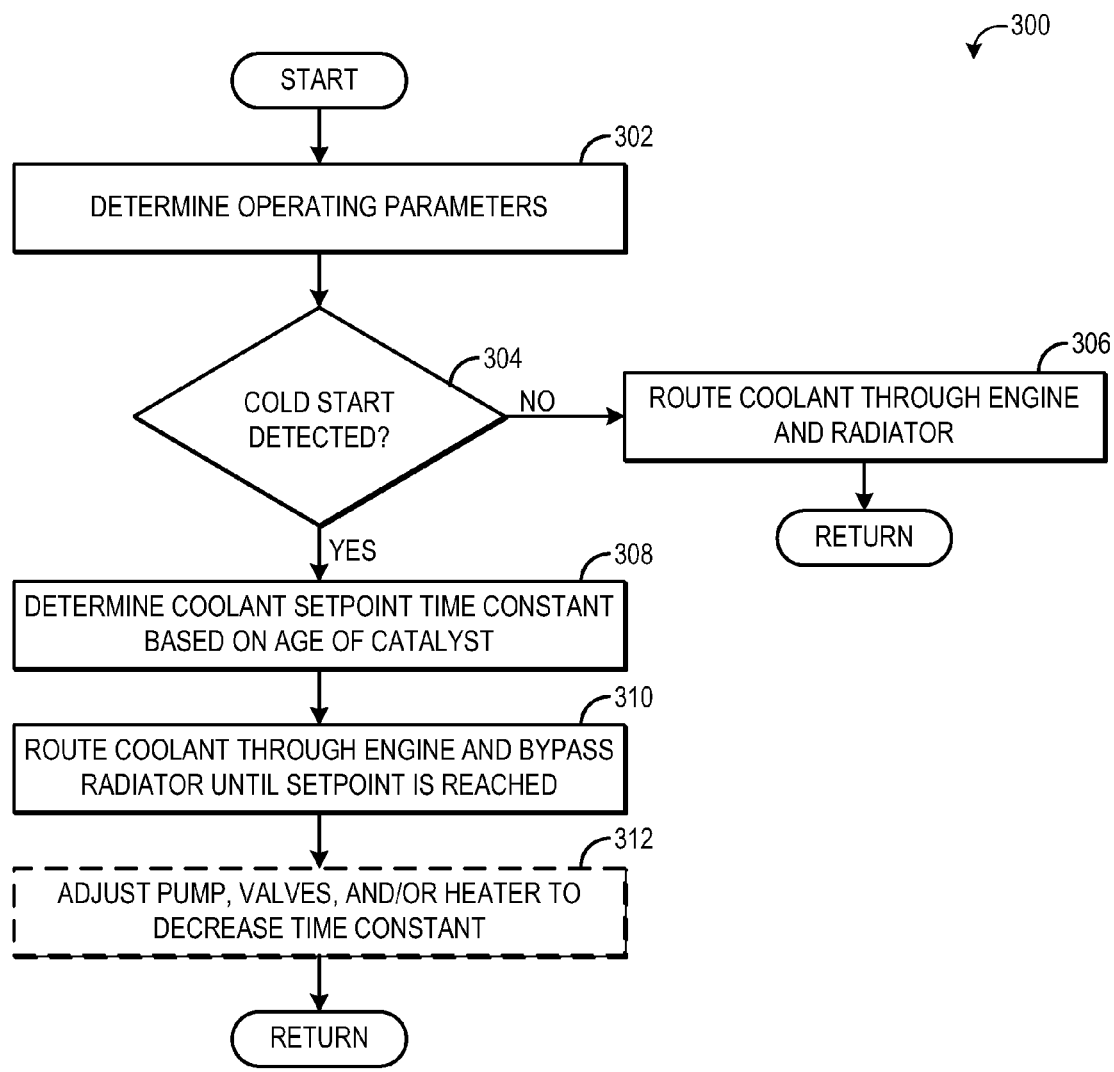
FIG. 3 is a flow chart illustrating an example method for heating a catalyst.

Turning now to FIG. 3, a method 300 for heating a catalyst is illustrated. Method 300 may be carried out by an engine controller, such as controller 12 of FIG. 1. Method 300 includes, at 302, determining engine operating parameters. The engine operating parameters may include engine temperature (as determined by the temperature of the engine coolant), engine speed and load, and catalyst age or level of degradation. As a catalyst ages, its ability to efficiently convert emissions in the exhaust gas flow may become degraded.

Hence, the terms catalyst age and catalyst level of degradation may both be used to indicate a relative level of catalyst efficiency. The age of the catalyst may be determined by an amount of elapsed time since the catalyst was installed in the engine, number of engine cycles since the catalyst was installed, etc., or it may be estimated based on output from various engine sensors. For example, a NOx sensor may be positioned downstream of the catalyst, and the amount of NOx emissions may be used to indicate the relative efficiency (and hence age or degradation level) of the catalyst. Additionally or alternatively, output from exhaust gas sensors both upstream and downstream of the catalyst may provide an estimation of the efficiency and age of the catalyst.

At 304, it is determined if the engine is operating under cold start conditions. Cold start conditions may be determined based on the temperature of the engine coolant. For example, if the temperature of the engine coolant is below the setpoint temperature (e.g., 90° C.), the engine may be operating with cold start conditions. Alternatively or additionally, cold start conditions may be detected if the engine is at ambient temperature during the start of the engine. If a cold start is not detected, method 300 proceeds to 306 to route coolant through the engine and radiator (in order to cool the hot coolant from the engine). Method 300 then returns.

If cold start conditions are detected, method 300 proceeds to 308 to determine the coolant setpoint time constant based on the level of degradation or age of the catalyst. The coolant setpoint time constant may be representative of the amount of time the cooling system will take to reach the setpoint temperature. For example, the constant tau described above with respect to FIG. 2 may be the coolant setpoint time constant. The time constant may decrease as the age of the catalyst increases, in order to more rapidly heat the catalyst to light-off temperature. The controller may have a map stored in its memory that maps the time constant to the age of the catalyst; the graph described above and depicted in FIG. 2 is an example of a map that may be used to determine the time constant from the age of the catalyst. For example, as shown in FIG. 2, if the catalyst is new (e.g., no degree of aging), the time constant may be set to 500 seconds.

At 310, coolant is routed through the engine and may at least partially bypass the radiator. Until the coolant reaches the setpoint temperature, the radiator may be at least partially bypassed in order to heat the coolant using the engine. The radiator may be bypassed by fully or partially opening a valve in a bypass passage, for example.

At 312, one or more parameters of the cooling system may be optionally adjusted in order to attain the previously determined time constant. For example, as explained previously, the coolant pump may be deactivated, the valve in the bypass around the radiator may be adjusted, and/or a heater in the coolant system may be activated in order to more rapidly heat the coolant to the setpoint temperature. The various cooling system parameters may be adjusted in an order dependent on the age of the catalyst. For example, if the catalyst is aged by a first, smaller degree, the coolant pump may be deactivated and/or the valve may be adjusted. If the catalyst is aged by a second, larger degree, the heater may be activated.

In another example, the position of the radiator bypass valve may be regulated in a manner dependent on the age of the catalyst. For example, when the catalyst is not degraded or is new, the valve may be controlled to a first position in order to redirect a portion of the coolant around the radiator until the setpoint temperature is reached. Then, when the catalyst reaches a threshold level of degradation, the valve may be controlled to a second position to redirect a larger portion of the coolant around the radiator to more rapidly reach the setpoint temperature. This may include setting a new, transient setpoint temperature that is higher than the original setpoint temperature, and once the new setpoint temperature is reached, cooling the coolant back to the original setpoint temperature. Upon adjusting parameters to warm the coolant, method 300 returns.

Thus, in an embodiment, a method for an engine includes during a cold engine start, adjusting a temperature of coolant in an engine cooling system based on degradation of an exhaust catalyst positioned downstream of the engine. Adjusting the temperature of the coolant may further comprise adjusting a time constant of a response of the cooling system to reach a setpoint coolant temperature. The time constant may decrease as the level of degradation of the exhaust catalyst increases. To adjust the temperature of the coolant, one or more of a coolant system pump, valve, and heater may be adjusted. The degradation of the catalyst may be determined based on feedback from one or more exhaust sensors positioned downstream of the exhaust catalyst. The method may include raising coolant temperature more quickly at higher exhaust catalyst degradation levels, and raising coolant temperature more slowly at lower exhaust catalyst degradation levels.

In another embodiment, an engine system comprises a pump configured to pump coolant to an engine; a heater positioned along a coolant passageway; an exhaust catalyst; and a controller including instructions to, during engine cold start conditions, adjust one or more of the pump and heater responsive to an age of the exhaust catalyst. The controller may include instructions to deactivate the pump during engine cold start conditions if the age of the exhaust catalyst is above a first threshold, and the controller may include instructions to activate the heater during engine cold start conditions if the age of the exhaust catalyst is above a second threshold, larger than the first threshold. The controller may include instructions to determine the age of the exhaust catalyst based on feedback from one or more exhaust sensors.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling an internal combustion engine having an exhaust-gas aftertreatment device during a cold-start phase, comprising:
adjusting a temperature of cooling water to a setpoint operating temperature as a function of a degree of aging of the exhaust-gas aftertreatment device of the internal combustion engine, wherein the temperature of the cooling water is increased more quickly as a present degree of aging of the exhaust-gas aftertreatment device increases.

2. The method as claimed in claim 1, wherein, during the cold-start phase, adjusting the temperature of the cooling water to the setpoint operating temperature as a function of the degree of aging of the exhaust-gas aftertreatment device further comprises one or more of adjusting passive systems including a cooling water circulating pump in the cooling water tract and/or valves in the cooling water circuit, and adjusting active systems including an electric or microwave heater in a cooling water circuit.

3. The method as claimed in claim 1, wherein the present degree of aging of the exhaust-gas aftertreatment device is determined based on stored tables and/or measured values.

4. The method as claimed in claim 1, wherein, during the cold-start phase, the temperature of the cooling water is further adjusted to the setpoint operating temperature as a function, which increases continuously with a continuously decreasing gradient, of time.

5. The method as claimed in claim 1, wherein, during the cold-start phase, the temperature of the cooling water is adjusted to the setpoint operating temperature substantially based on a function including cooling water temperature at time t after starting of the internal combustion engine, cooling water temperature upon starting of the internal combustion engine, setpoint operating temperature of the cooling water, and a constant.

6. The method as claimed in claim 5, wherein the constant comprises a value for the degree of aging of the exhaust-gas aftertreatment device, said value being of an order of magnitude of at least one hundred seconds for a new exhaust-gas aftertreatment device and becoming progressively smaller with progressive aging of the exhaust-gas aftertreatment device.

7. The method as claimed in claim 1, wherein the internal combustion engine is installed in a motor vehicle.

8. The method as claimed in claim 1, wherein the internal combustion engine is a diesel engine.

9. The method as claimed in claim 1, wherein the exhaust-gas aftertreatment device has a catalytic noble metal coating.

10. A device for controlling the internal combustion engine having the exhaust-gas treatment device during the cold-start phase, the device configured for carrying out the method according to claim 1.

11. A method for an engine, comprising:
during a cold engine start, adjusting a temperature of coolant in an engine cooling system based on degradation of an exhaust catalyst positioned downstream of the engine.

12. The method of claim 11, wherein adjusting the temperature of the coolant further comprises adjusting a time constant of a response of the cooling system to reach a setpoint coolant temperature.

13. The method of claim 12, wherein the time constant decreases as the age of the exhaust catalyst increases.

14. The method of claim 11, further comprising adjusting one or more of a coolant system pump, valve, and heater to adjust the temperature of the coolant.

15. The method of claim 11, wherein degradation of the catalyst is determined based on feedback from one or more exhaust sensors positioned downstream of the exhaust catalyst.

16. The method of claim 11, wherein adjusting the temperature of the coolant further comprises raising coolant temperature more quickly at higher exhaust catalyst degradation levels, and raising coolant temperature more slowly at lower exhaust catalyst degradation levels.

17. An engine system, comprising:
a pump configured to pump coolant to an engine;
a heater positioned along a coolant passageway;
an exhaust catalyst; and
a controller including instructions to, during engine cold start conditions, adjust one or more of the pump and heater responsive to an age of the exhaust catalyst.

18. The engine system of claim 17, wherein the controller includes instructions to deactivate the pump during engine cold start conditions if the age of the exhaust catalyst is above a first threshold.

19. The engine system of claim 18, wherein the controller includes instructions to activate the heater during engine cold start conditions if the age of the exhaust catalyst is above a second threshold, larger than the first threshold.

20. The engine system of claim 17, wherein the controller includes instructions to determine the age of the exhaust catalyst based on feedback from one or more exhaust sensors.

* * * * *